Aug. 10, 1965   L. A. TOTH   3,199,330
ANTIFRICTION THRUST BEARINGS OF ROLLING MILLS
Original Filed May 14, 1962
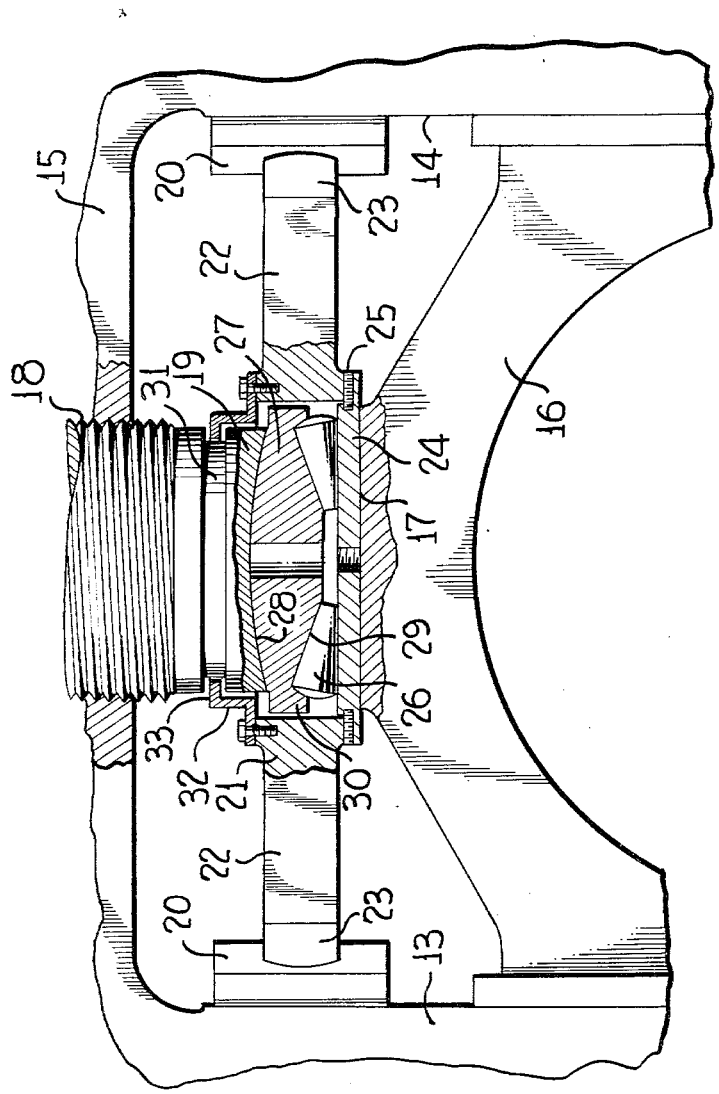
LEO A. TOTH
INVENTOR
BY *Mason, Porter, Miller & Steward*
ATTORNEYS 3,199,330
ANTIFRICTION THRUST BEARINGS OF ROLLING MILLS
Leo A. Toth, South Bend, Ind., assignor to The Torrington Company, Torrington, Conn., a corporation of Maine
Original application May 14, 1962, Ser. No. 194,542. Divided and this application Aug. 6, 1964, Ser. No. 387,829
6 Claims. (Cl. 72—248)

This application is a division of the application for patent of Leo A. Toth filed May 14, 1962, Serial No. 194,542.

The specification which follows relates to an improved antifriction thrust bearing for rolling mills. Constant adjustment in small, precise amounts is required in the spacing of the work rolls in view of the current practice of rolling metal billets, plates and strips at relatively high speed. To make this accurate adjustment by the mill screws without undue friction is the purpose of this invention.

The use of antifriction thrust bearings for this purpose is old but offers certain problems due to limitations in the necessity of providing lateral adjustment between the mill screws and the thrust bearings.

It is an object of the invention to provide a concave roller thrust bearing having a spherical seat for providing increased sensitivity and freedom for lateral or radial adjustment of the bearing members relative to the mill screws.

It is a further object of the invention to obtain this improved result without the necessity of using an intermediate bearing block between the screw and the upper race member.

It is a further object of my invention to provied a compact bearing until with means for coupling the bearing parts together, which may be assembled previously and then installed as a complete unitary structure.

As illustrating the invention and by way of example, the preferred form of the invention is shown on the accompanying drawing showing a side elevation of this embodiment.

Briefly speaking, the invention consists in providing an antifriction roller bearing unit slidably supported on the pedestals of a rolling mill. This unit comprises a roller bearing in which the lower race member is flat, resting upon the chock of the rolling mill, while the upper race member is given a spherical, preferably convex form. This fits under the complementary shaped end of the mill screw. The bearing unit is coupled to the mill screw in such a way as to move vertically when the latter is elevated.

On the drawing, a pedestal has been shown as part of a rolling mill which may be two or more rolls high. The sides 13, 14 of the pedestal form parallel guides for the chocks of the mill roll as is usual.

A bridge member 15 connects the upper ends of the pedestals 12, 12.

The chock 16 is shown as slidably mounted on the pedestals 13, 14. This chock has a flat top 17 on which the roller bearing unit rests.

The upper portions of the sides 13, 14 carry vertical guide rails 20.

A central collar 21 is provided. This has diametrically extended bars 22, 22. These bars are slotted at their ends to form shoes 23, 23, slidable on the rails 20. A lower race member 24 forms the bottom of the collar 21 to which it is connected by means of bolts 25. This lower race member has a flat, horizontal bottom surface slidably resting upon the flat top 17 of the chock 16. The lower race member has a parallel flat top surface. This serves as a surface upon which conical bearing rollers 26 rest.

An upper bearing member 27 is provided in the collar 21. The bearing member has a convex upper surface 28, complementary to the spherical end of the mill screw. While the drawing shows the end of the mill screw to be concave and the upper surface of the race member to be convex, this may be reversed.

The lower surface 29 of the upper bearing member 27 is conisal to conform to the taper of the bearing rollers 26.

Outside of the rollers 26, the upper bearing member has a depending rim 30 which confines the rollers.

The lower end of the mill screw is provided with a peripheral groove 31. Part-circular ring members 32 are bolted to the upper edge of the collar 21. These ring members have inwardly directed flanges 33 which fit loosely within the grooves 31.

The flanges 33 serve as dust seals. At the same time they are effective to raise the bearing unit with the mill screw when the latter is elevated.

With the arrangement above described, precise and effective adjustments can be made of the chock 16 with respect to the mill screw 18. While the lower race member 24 rests in the plane of the flat top 17 of the chock 16, it may shift laterally due to looseness of the engagement between the shoes 23 and the guide rails 20.

Lateral adjustment is also permissible to bring the upper bearing member 27 into axial alignment with the mill screw 18. When thus engaged, the spherical surfaces of the two elements serve to maintain them on center.

The antifriction bearing is wholly contained within the collar 21. Thus when the mill screw is elevated, the collar and the contained antifriction bearing rise also. This is accomplished by the provision of the flange 33 loosely engaging in the groove 31.

The preferred form of the invention having been illustrated, numerous variations in structure and proportions are possible within the scope of the following claims.

What I claim is:

1. The combination in a rolling mill having parallel vertical pedestals, a connecting bridge and a chock, of a mill screw carried by the bridge, vertical guide rails on the pedestals, a collar slidable on the guide rails, an antifriction bearing in the collar and means for coupling the collar to the mill screw.

2. The combination in a rolling mill having parallel vertical pedestals, a connecting bridge and a chock, of a mill screw having a spherical end carried by the bridge, vertical guide rails on the pedestals, a collar slidable on the guide rails, means for coupling the collar to the mill screw and an antifriction bearing in the collar having a spherical top surface complementary to that on the end of the mill screw.

3. The combniation in a rolling mill having parallel vertical pedestals, a connecting bridge and a chock, of a mill screw having a concave end carried by the bridge, vertical guide rails on the pedestals, a collar slidable on the guide rails, means for coupling the collar to the mill screw and an antifriction bearing in the collar having a convex top surface complementary to that on the end of the mill screw.

4. The combination in a rolling mill having parallel vertical pedestals, a connecting bridge and a chock, of a mill screw having a concave end carried by the bridge, vertical guide rails on the pedestals, a collar slidable on the guide rails, means for coupling the collar to the mill screw, a lower race member carried by the collar, an upper race member loosely carried by the collar and a series of bearing elements between the race members, the upper race member having a top surface complentary to that on the end of the mill screw.

5. The combination in a rolling mill having parallel vertical pedestals, a connecting bridge and a chock, of a mill screw having a peripheral groove and a spherical end, carried by the bridge, vertical guide rails on the pedestals, a collar slidable on the guide rails, an anti-friction bearing in the collar having a top surface complementary to that on the end of the mill screw and coupling means on the collar engaging the groove of the mill screw.

6. The combination in a rolling mill having parallel vertical pedestals, a connecting bridge and a chock, of a mill screw having a peripheral groove and a spherical end, carried by the bridge, vertical guide rails on the pedestals, a collar slidable on the guide rails, an anti-friction bearing in the collar having a top surface complementary to that on the end of the mill screw and part circular ring members on the collar engaging the groove of the mill screw.

References Cited by the Examiner
UNITED STATES PATENTS

| | | | |
|---|---|---|---|
| 1,084,107 | 1/14 | Pisarcik | 80—56 |
| 2,734,407 | 2/56 | Smith | 80—56 |
| 3,055,243 | 9/62 | Cauley et al. | 80—57 |

WILLIAM J. STEPHENSON, *Primary Examiner.*